Patented Oct. 2, 1928.

1,686,260

UNITED STATES PATENT OFFICE.

WALTER O. SNELLING, OF ALLENTOWN, PENNSYLVANIA.

CONTACT RECTIFYING DEVICE.

No Drawing.   Application filed July 29, 1927. Serial No. 209,403.

My invention relates to contact rectifying devices of the general nature of natural crystal detectors, and more particularly relates to improvements in contact rectifiers, electric valves, contact detectors and like devices having the property of detecting electro magnetic waves, and of modifying the currents set up by ether waves or other radiant energy.

It has long been known that the electrical conductivity of certain natural minerals varies with the intensity and duration of the applied electro-motive force and responds to changes in the relative area of contact and intimacy of contact of electrodes touching such mineral, while even changes in the intensity of light falling upon certain natural minerals cause electrical effects mainly shown by changes in the electrical resistance of such minerals. This general property has been referred to as "uni-directional" conductivity, but may be more properly called selective conductivity or valve action, since in many cases the selective action made use of in the detection of radiant energy is not the directional factor at all, but is rather variation in response of the contact element to changes in the kind or in the intensity of the applied influence.

The fact that many natural minerals show selective electrical conductivity has caused efforts to be made to prepare synthetic products having the same effect. On preparing the corresponding sulfides, selenides, tellurides and arsenides of metals known to possess current rectifying properties as the naturally occurring crystals, by fusing together suitable metallic and non-metallic components, products have been obtained which possess fair rectifying properties. It is known, for example, that by melting together a mixture of lead and sulfur to form lead sulfide, the fusion mass obtained possesses current rectifying properties which are approximately equal to the current rectifying properties of some crystals of natural galena although far inferior to the current rectifying effects shown by occasional natural crystals which possess exceptional current rectifying ability as compared with average galena.

Efforts up to this time to produce current rectifying bodies by the wet precipitation of the sulfides, selenides, tellurides and arsenides of metals have not been particularly successful and although the sulfides of several metals, prepared by the precipitation of solutions of salts of the metal by means of hydrogen sulfide, have given products of slight rectifying property, in no case has an artificial product produced by a wet reaction possessed sufficient sensitiveness to be of commercial importance.

I have discovered a procedure by means of which contact rectifying products may be obtained by either thermal reactions or by wet precipitation methods, my products possessing exceptional sensitiveness and selectivity. My present application is a continuation in part of my Patent 1,638,278, August 9, 1927, and the products obtained by the practice of my present invention are not only greatly superior to the products previously obtained by wet precipitation methods, but in general are superior to the corresponding natural minerals.

As an example of my present invention, I will describe a process which I may employ in preparing contact rectifying products by the wet precipitation of lead sulfide. I first precipitate a solution of any suitable salt of lead, such as the nitrate or acetate by means of hydrogen sulfide or a suitable alkali sulfide by the well known methods of chemistry. After drying, the amorphous precipitate of lead sulfide possesses only very feeble rectifying or detecting properties. I now compress this precipitate, by means of a suitable hand press or mechanical press, preferably employing a pressure in excess of 200 kilos per sq. centimeter. The compressed product so obtained possesses somewhat better rectifying properties than the dried precipitate before compression, but is still too insensitive to form a satisfactory commercial contact rectifier. I next treat or condition the pellet or block obtained by my compressing operation, by gentle heating in a non-oxidizing atmosphere, employing a temperature materially lower than the fusion temperature of the lead sulfide, and preferably performing the heating step in an atmosphere comprising sulfur vapor and sulfur dioxide or in an atmosphere comprising carbon bisulfide and sulfur dioxide. A temperature of from 50° C. to 100° C. lower than the fusion temperature of the lead sulfide is suitable, although increased rectifying effects are produced by heating at temperatures still further removed from the fusion temperature of the material treated. A treatment period of from five minutes to one hour may be given, according to the sensitiveness desired in the resulting product.

The above example represents the simplest form of my present invention, and gives products that are much superior to any products previously obtained by wet precipitation methods. By suitable modifications of the above procedure however, I have found it possible to obtain materially improved sensitiveness, as compared with the results of the simple procedure described.

In my pending applications S. N. 615,160 filed January 26, 1923, and S. N. 617,173 filed February 5, 1923, I have described improved current rectifying elements made by reactions at elevated temperatures between the oxide compounds of metals and suitable non-metallic elements, and certain forms of my present invention represent in part the application of the principles of my prior inventions to the preparation of current rectifying elements by wet or precipitation reactions.

I find, for example, that by mixing from a few percent up to 50% or more of sulfur with the precipitated lead sulfide before my compressing or briquetting operation, I can obtain a desirable modification and control of the density, the electrical conductivity and the current rectifying characteristics of my final product. By admixing a few percent of lead oxide with precipitated lead sulfide and sulfur before my compressing or briquetting operation I also obtain modified products possessing increased selectivity.

Although I have referred to precipitated lead sulfide as a material which I may use in the practice of my present invention, my invention is not limited to the use of this material, but on the contrary I have found that my invention is widely applicable to the preparation by wet methods of compounds possessing selective conductivity, and for the most part corresponding to minerals of known contact-rectifying characteristics, although in general I obtain the most satisfactory results by the use of heavy metals such as lead and bismuth and elements of the sulfur group such as sulfur and selenium. The results obtained from such metals as copper, silver, iron and molybdenum, and such non-metallic elements as tellurium and arsenic are in general less satisfactory, but this is to be expected in view of the known fact that a somewhat similar relationship exists in the case of the naturally occurring minerals.

The essential feature of my present invention is the consolidation of precipitates obtained by wet reactions between metal and non-metallic components, or equivalent materials in pulverized or finely divided condition, and the heating of the resulting compressed mass at a temperature lower than the fusion or sintering temperature of the material, until notably increased current rectifying properties result. My present invention rests upon my discovery that the rectifying effects of pulverulent masses of highly compressed lead sulfide or like material may be greatly increased by the heating of such compressed masses at temperatures materially lower than those necessary to produce fusion, the effect being apparently to induce molecular rearrangement with corresponding variation in the electronic structure of the material at the points of contact of separate particles of the material brought together under the influence of the pressure used in consolidating the material.

Although the cause of contact rectifying action is at present unknown, it is my belief that such action is a factor of unsymmetrical attraction for electrons on the part of atoms present in combined condition in the molecular structure of the material. A crystalline material tends to be symmetrical and the electrons in such crystalline material tend to be symmetrically arranged about the atoms present in the material. Imperfections in the crystalline structure of the material have a tendency to permit of one-sided attraction for the electrons, however, and my present invention relates primarily to the establishment of conditions particularly favorable for the production of the lack of symmetry apparently desirable as a factor in producing current rectifying properties.

As a step in the production of contact rectifying bodies I prepare a substantially amorphous mass of a material possessing potential current rectifying properties. My basic material may be truly amorphous or it may be colloidal or sub-crystalline, or it may be vitreous. The essential factor is that the material must be sub-crystalline, although possessing an internal tendency toward crystalline structure. A finely pulverized crystalline material or an amorphous or sub-crystalline precipitate of a crystalline material, or a super-cooled vitreous mass of a normally crystalline material or a colloidal mass of a normally crystalline material represent conditions favorable to the practice of my present invention when the crystalline material possesses fair electrical conductivity in its normally crystalline condition. The effect of pressure upon amorphous or sub-crystalline masses of material is to bring together under conditions of intimate contact particles of the material capable of producing at the points of contact, the development of crystalline structure. Upon the heating of the material, devitrefication of the vitreous phase of the material results, and at points where particles of the material have been brought together under conditions of pressure in the consolidation step a rearrangement of molecules results, with a resulting tendency for the production of a crystalline structure. If this condition favorable to the production of a crystalline structure were permitted to continue until complete crystallization had occurred little or no improved rectification would result, as a completely crystalline condition is relatively about as unfavorable to current rectifying action as is a colloidal or sub-crystalline condition. I have discovered, however, that a meta-colloidal or semi-crystalline condition is particularly favorable to current rectifying action, and that by bringing together under conditions of high pressure a mass of particles in colloidal or sub-crystalline condition, and then heating such particles at a temperature favorable to molecular mobility but materially lower than the fusion temperature of the material until partial crystallization occurs, with the development of crystals of larger size than any present in the initial material, but without the formation of a completely crystalline aggregate, notable current rectifying ability is produced as a result apparently of the partial but incomplete development of crystals within the material, with the consequent development of a large number of areas within the material at which the electron structure is unsymmetrical, and in which zones large numbers of electrons exist in relatively mobile condition.

I do not claim as any part of my present invention the fusion of lead sulfide or like material to form single crystals or even crystalline aggregates, or the heating of lead sulfide or like material to a sintering temperature. My present invention relates specifically to the consolidation by pressure of a sub-crystalline mass of lead sulfide or like material, and the heating of such consolidated mass to a temperature sufficient to cause the development of incomplete crystals within the mass of material, or the growth of crystal fragments within the mass of material, but such temperature being lower than either the fusion temperature or the sintering temperature of the material. My present invention rests directly upon my discovery that rectification by a pulverulent or vitreous mass of material is increased by subjecting such material to a temperature favorable to devitrification or crystal growth but lower than the sintering temperature of the material, the conditioning treatment being continued only for a sufficient period to produce desired current rectifying ability, the formation of complete crystals leading to the loss of the rectifying ability produced by partial crystal formation, and accordingly being avoided.

My invention is broadly applicable to the preparation of a great number of sulfides, selenides, tellurides and arsenides possessing current rectifying characteristics. Although I prefer to employ as my metal element the heavy metals such as lead and bismuth, I find that many other metals may be used for the production of bodies having current rectifying characteristics, and in general I find that by the application of my invention I am able to prepare contact rectifying bodies corresponding to the principal mineral sulfides, selenides, tellurides and arsenides possessing current rectifying characteristics.

Although in the practice of my present invention I prefer to make use of the principles of controlling density and the current conducting properties described in my prior applications S. N. 615,160 and S. N. 617,173, yet these do not form an essential feature of my present invention, which broadly comprises methods of improving the current rectifying characteristics of amorphous precipitates and finely divided solids by consolidating such precipitates until an integral mass of material is produced and by heating the consolidated products so obtained to a temperature sufficient to permit of crystal growth, but not sufficient to produce either fusion or sintering.

It will be evident that a wide range of equivalents may be used in connection with my present invention, without departing from the spirit of the disclosure herein made. Although I have referred to certain examples as representing specific embodiments, my invention should not be considered as limited to the examples given, and no limitations should be imposed except such as are indicated in the appended claim.

I claim:

The process of treating current rectifying materials which comprises applying pressure to a finely divided compound of a metal with an element of the sulfur group until a coherent mass results and thereafter heating the resulting coherent product at a temperature sufficient to produce partial crystal growth, but lower than a sintering temperature.

In testimony whereof, I have hereunto subscribed my name this 27th day of July, 1927.

WALTER O. SNELLING.